(12) United States Patent
Hirashita et al.

(10) Patent No.: US 8,753,136 B2
(45) Date of Patent: Jun. 17, 2014

(54) POWER FEEDING PLUG LOCKING DEVICE

(75) Inventors: Takahiro Hirashita, Aichi (JP); Keiji Kahara, Aichi (JP); Toshiharu Katagiri, Aichi (JP); Keigo Nishimoto, Aichi (JP); Tomohiro Inoue, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 125 days.

(21) Appl. No.: 13/238,895

(22) Filed: Sep. 21, 2011

(65) Prior Publication Data

US 2012/0083148 A1 Apr. 5, 2012

(30) Foreign Application Priority Data

Sep. 30, 2010 (JP) ................................ 2010-222449

(51) Int. Cl.
*H01R 13/62* (2006.01)

(52) U.S. Cl.
USPC .......................................................... 439/304

(58) Field of Classification Search
USPC ................... 439/304, 352, 358, 372; 320/109
See application file for complete search history.

(56) References Cited

U.S. PATENT DOCUMENTS

| | | | | |
|---|---|---|---|---|
| 3,904,947 A * | 9/1975 | Crews | ............................ | 320/138 |
| 5,545,049 A * | 8/1996 | Hasegawa et al. | ............ | 439/310 |
| 5,596,261 A * | 1/1997 | Suyama | ........................ | 320/152 |
| 5,627,448 A * | 5/1997 | Okada et al. | .................... | 439/133 |
| 5,637,977 A * | 6/1997 | Saito et al. | ..................... | 320/109 |
| 5,656,916 A * | 8/1997 | Hotta | ............................ | 320/160 |
| 5,676,560 A * | 10/1997 | Endo et al. | ..................... | 439/310 |
| 6,203,355 B1 * | 3/2001 | Neblett et al. | ................. | 439/372 |
| 6,373,380 B1 * | 4/2002 | Robertson et al. | ......... | 340/425.5 |
| 6,941,197 B1 * | 9/2005 | Murakami et al. | .............. | 701/22 |
| 7,795,841 B2 * | 9/2010 | Matsumoto | ..................... | 320/109 |
| 7,878,866 B1 * | 2/2011 | Kwasny et al. | ................ | 439/695 |
| 7,963,793 B2 * | 6/2011 | Poulin et al. | ................... | 439/352 |
| 8,016,607 B2 * | 9/2011 | Brown, II | ........................ | 439/353 |
| 8,075,329 B1 * | 12/2011 | Janarthanam et al. | ......... | 439/304 |
| 8,197,277 B1 * | 6/2012 | Teichmann | ..................... | 439/304 |
| 8,206,171 B2 * | 6/2012 | Osawa et al. | .................. | 439/352 |
| 8,251,734 B2 * | 8/2012 | Katagiri et al. | ................ | 439/352 |
| 8,357,002 B2 * | 1/2013 | Katagiri et al. | ................ | 439/304 |
| 8,376,767 B2 * | 2/2013 | Kahara et al. | .................. | 439/304 |

(Continued)

FOREIGN PATENT DOCUMENTS

| | | |
|---|---|---|
| JP | 9-161898 | 6/1997 |
| JP | 2007236172 | 9/2007 |

(Continued)

*Primary Examiner* — Amy Cohen Johnson
*Assistant Examiner* — Vladimir Imas
(74) *Attorney, Agent, or Firm* — Patterson Thuente Pedersen, P.A.

(57) ABSTRACT

A power feeding plug locking device that locks a power feeding plug to a power feeding inlet. The power feeding inlet is arranged in a machine including a door that can be locked. The locking device includes a lock mechanism of which operational state is shifted between a lock state and an unlock state. The lock mechanism prohibits removal of the power feeding plug from the inlet in the lock state and allows removal of the power feeding plug from the inlet in the unlock state. An operation unit is operated when switching the operational state of the lock mechanism between the lock state and the unlock state. A door lock state confirmation unit confirms whether the door of the machine is locked. A controller controls the operational state of the lock mechanism based on the operation of operation unit whether the door is locked.

19 Claims, 6 Drawing Sheets

(56) References Cited

U.S. PATENT DOCUMENTS

| | | | |
|---|---|---|---|
| 8,393,423 B2* | 3/2013 | Gwozdek et al. | 180/65.27 |
| 2009/0024267 A1 | 1/2009 | Kawai | |
| 2009/0091477 A1* | 4/2009 | McCall et al. | 340/990 |
| 2009/0286414 A1* | 11/2009 | Ohtomo | 439/299 |
| 2011/0034053 A1* | 2/2011 | Matsumoto et al. | 439/304 |
| 2011/0277516 A1* | 11/2011 | Kahara et al. | 70/58 |
| 2011/0277519 A1* | 11/2011 | Hirashita | 70/237 |
| 2011/0287649 A1* | 11/2011 | Kurumizawa et al. | 439/304 |
| 2011/0300728 A1* | 12/2011 | Katagiri et al. | 439/147 |
| 2011/0300736 A1* | 12/2011 | Katagiri et al. | 439/347 |
| 2012/0083148 A1* | 4/2012 | Hirashita et al. | 439/304 |
| 2012/0234061 A1* | 9/2012 | Inoue et al. | 70/255 |
| 2012/0238122 A1* | 9/2012 | Hirashita et al. | 439/304 |
| 2012/0252251 A1* | 10/2012 | Hirashita | 439/304 |
| 2013/0015951 A1* | 1/2013 | Kuramochi et al. | 340/5.64 |

FOREIGN PATENT DOCUMENTS

| | | |
|---|---|---|
| JP | 2007245999 | 9/2009 |
| JP | 4379823 | 10/2009 |
| JP | 2010103003 | 5/2010 |
| JP | 2010124556 | 6/2010 |

* cited by examiner

POWER FEEDING PLUG LOCKING DEVICE

CROSS-REFERENCE TO RELATED APPLICATIONS

This application is based upon and claims the benefit of priority from prior Japanese Patent Application No. 2010-222449, filed on Sep. 30, 2010, the entire contents of which are incorporated herein by reference.

BACKGROUND OF THE INVENTION

The present invention relates to a power feeding plug locking device that locks a power feeding plug, which is connected to an inlet to charge a battery.

Nowadays, automobile manufacturers are making strong efforts toward the development of electric vehicles, including hybrid vehicles, to reduce vehicle emissions. Electric vehicles are driven by motors. In such an electric vehicle, a battery serves as a power source of the vehicle. Whenever the state of charge of the vehicle battery becomes low, the battery is charged, for example, by a household power outlet or at a charging station.

Japanese Laid-Open Patent Publication No. 9-161898 describes a power feeding system installed in an electric vehicle that can easily be handled by a user. In the prior art, the vehicle includes an inlet that accommodates a power feeding connector, which is connectable to a power feeding plug extending from, for example, a household power outlet. When the user is at home, the user connects the power feeding plug to the inlet of the parked vehicle. This supplies the vehicle with commercial power and charges the vehicle battery.

A power feeding plug locking device is used to prevent unauthorized removal of the power feeding plug from the inlet. One example of such a locking device includes a lock bar moved back and forth by a motor, which serves as a drive source. In this structure, when connecting the power feeding plug to the inlet, the locking device moves the lock bar to a lock position and locks the power feeding plug. When the power feeding plug is in such a lock state, the power feeding plug cannot be removed from the inlet. When removing the power feeding plug from the inlet, the lock bar is moved to an unlock position to unlock the power feeding plug. This allows the power feeding plug to be moved.

In the above-described power feeding plug locking device, the operations for locking and unlocking the power feeding plug with the locking device may be burdensome for a user. Japanese Patent No. 4379823 describes a power feeding plug locking device that solves such a problem. The power feeding plug locking device locks and unlocks a power feeding plug in cooperation with the locking and unlocking of the vehicle doors. This structure is convenient since the user simply locks and unlocks the doors to operate the power feeding plug locking device.

When the power feeding plug locking device cooperates with the door lock, the power feeding plug locking device performs a locking operation and an unlocking operation whenever the doors are locked and unlocked. Thus, the power feeding plug locking device is operated even when there is no need for it to be operated. As a result, the operation frequency of the power feeding plug locking device is increased. This may adversely affect the durability of the components forming the power feeding plug locking device.

SUMMARY OF THE INVENTION

The present invention provides a power feeding plug locking device that improves the durability of components.

One aspect of the present invention is a power feeding plug locking device that locks a power feeding plug to a power feeding inlet. The power feeding inlet is arranged in a machine including a door that can be locked. The power feeding plug locking device includes a lock mechanism of which an operational state is shifted between a lock state and an unlock state. The lock mechanism prohibits removal of the power feeding plug from the inlet in the lock state and allows removal of the power feeding plug from the inlet in the unlock state. An operation unit is operated when shifting the operational state of the lock mechanism between the lock state and the unlock state. A door lock state confirmation unit confirms whether the door of the machine is locked. A controller controls the operational state of the lock mechanism based on the operation of operation unit and whether the door is locked.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

A power feeding plug locking device according to one embodiment of the present invention will now be described with reference to FIGS. 1 to 10. The power feeding plug locking device is arranged in, for example, an inlet of a plug-in hybrid vehicle 1.

Figure 1:
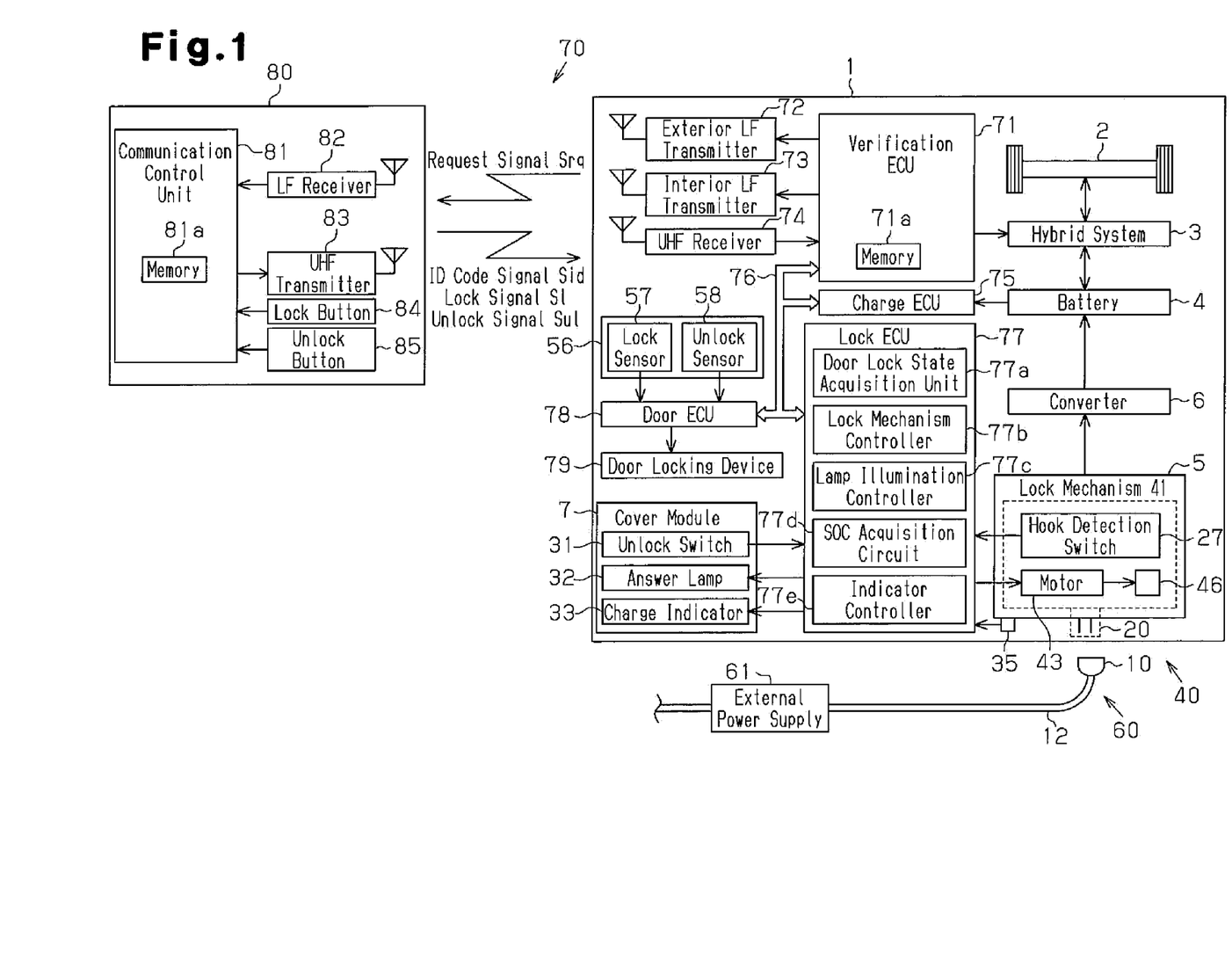
FIG. 1 is a schematic block diagram showing a vehicle and a charging system.

As shown in FIG. 1, the hybrid vehicle 1 includes drive wheels 2 and a hybrid system 3, which combines and outputs the drive forces of an engine and motor that serve as drive sources of the drive wheels 2. The hybrid system 3 controls the hybrid vehicle 1 in various modes, such as a mode using only the engine to drive the drive wheels 2, a mode using the motor while generating electric power with the engine to drive the drive wheels 2, a mode using both the engine and the motor to drive the drive wheels 2, and a mode using only the motor to drive the drive wheels 2.

The hybrid system 3 is connected to a battery 4 that supplies the motor with power. The battery 4 is not only charged by the electric power the engine generates but may also be charged with nighttime electricity or the like using an external power supply 61, such as a household power outlet.

The vehicle 1 includes an electronic key system 70, which performs vehicle operations such as the locking and unlocking of doors without the driver actually operating a vehicle key. The electronic key system 70 uses an electronic key 80 as the vehicle key. The electronic key 80 is capable of transmitting a unique ID code through wireless communication. In the electronic key system 70, the vehicle 1 transmits a request signal Srq, which serves as an ID code return request. When the electronic key 80 receives the request signal Srq, in response, the electronic key 80 returns an ID code signal Sid to the vehicle 1 through narrowband wireless communication. The ID code signal Sid includes the unique ID code of the electronic key 80. When the ID code of the electronic key 80 conforms to the ID code of the vehicle 1, a vehicle operation such as the locking or unlocking of the doors is permitted or performed. The electronic key 80 functions as a communication terminal.

The electronic key system 70 will now be described. The vehicle 1 includes a verification electronic control unit (ECU) 71, which performs ID verification when performing narrowband wireless communication with the electronic key 80. The verification ECU 71 is connected to a vehicle exterior low frequency (LF) transmitter 72, a vehicle interior LF transmitter 73, and an ultrahigh frequency (UHF) receiver 74. The vehicle exterior LF transmitter 72 is arranged, for example, in each door of the vehicle 1 and transmits wireless signals out of the vehicle 1 on an LF band. The vehicle interior LF transmitter 73 is arranged, for example, in the vehicle under the floor and transmits wireless signals to the interior of the vehicle 1 on an LF band. The UHF receiver 74 is arranged, for example, in the rear of the vehicle body to receive signals on the UHF band. The verification ECU 71 functions as a communication master.

The electronic key 80 includes a communication control unit 81, which functions to perform wireless communication with the vehicle 1 in compliance with the electronic key system 70. The communication control unit 81 includes a memory 81a, which stores the unique ID code as a unique key code. The communication control unit 81 is connected to an LF receiver 82, which receives signals on the LF band, and a UHF transmitter 83, which transmits signals on the UHF band in accordance with commands from the communication control unit 81.

The verification ECU 71 transmits the request signal Srq on the LF band to the electronic key 80 from the vehicle exterior LF transmitter 72 or the vehicle interior LF transmitter 73 to perform the so-called smart communication. When the verification ECU 71 receives the ID code signal Sid from the electronic key 80 in response to the request signal Srq, the verification ECU 71 performs ID verification, or smart verification. When smart verification performed with the electronic key 80 outside the vehicle 1, namely, vehicle exterior verification, is successful, a door ECU 78 permits the locking and unlocking of the doors. For example, when the driver touches a lock sensor 57, which is arranged on a door handle 56, the door ECU 78 locks the doors with a door locking device 79. When the driver touches an unlock sensor 58, which is arranged on the door handle 56, the door ECU 78 unlocks the doors with the door locking device 79. Further, when smart verification performed with the electronic key 80 inside the vehicle 1, namely, vehicle interior verification, is successful, the verification ECU 71 permits activation of the hybrid system 3.

The electronic key system 70 includes a wireless key system that functions to lock and unlock the vehicle doors by transmitting a lock signal Sl or unlock signal Sul through wireless communication to the vehicle 1 when a switch of the electronic key 80 is operated. The verification ECU 71 manages the operation of the wireless key system. For example, the electronic key 80 includes a lock button 84, which transmits the lock signal Sul, and an unlock button 85, which transmits the unlock signal Sul. The lock button 84 and unlock button 85 are connected to the communication control unit 81. In this case, the UHF transmitter 83 transmits the lock signal Sl or unlock signal Sul, which includes the unique ID code of the electronic key 80, on the UHF band.

When the lock button 84 is operated, the lock signal Sl is transmitted from the UHF transmitter 83 of the electronic key 80. When the verification ECU 71 receives the lock signal Sl with the UHF receiver 74, the verification ECU 71 performs ID verification by verifying the ID code of the electronic key 80 with an ID code registered in its memory 71a. When the ID verification is successful, the verification ECU 71 sends a door lock command to the door ECU 78 to lock the doors with the door locking device 79.

When the unlock button 85 is operated, the lock signal Sul is transmitted from the UHF transmitter 83 of the electronic key 80. When the verification ECU 71 receives the unlock signal Sul with the UHF receiver 74, the verification ECU 71 performs ID verification by verifying the ID code of the electronic key 80 with an ID code registered in the memory 71a. When the ID verification is successful, the verification ECU 71 sends a door unlock command to the door ECU 78 to unlock the doors with the door locking device 79.

The vehicle 1 includes a battery charging system 60. The charging system 60 includes a power feeding plug 10 used to charge the battery 4. The power feeding plug 10 extends from an external power supply 61 of, for example, a household power outlet or a charging station. The power feeding plug 10 is connected by a cable 12 to the external power supply 61 (commercial power supply), which supplies 200 V of AC power, for example.

The plug-in hybrid vehicle 1 includes an inlet 5, which receives the power feeding plug 10. The inlet 5 is arranged in, for example, a front side surface of the vehicle body, and resembles a fuel tank opening of a gasoline vehicle. The inlet 5 includes a power receiving connector 20, which receives the power feeding plug 10. A converter 6 converts the AC power supplied from the power feeding plug 10 to DC voltage and charges the battery 4 with the DC voltage. The vehicle 1 allows charging to be performed when the power feeding plug 10 is fitted to the power receiving connector 20 and the electronic key 80 carried by the driver is verified. The vehicle 1 is one example of a machine.

Figure 2:
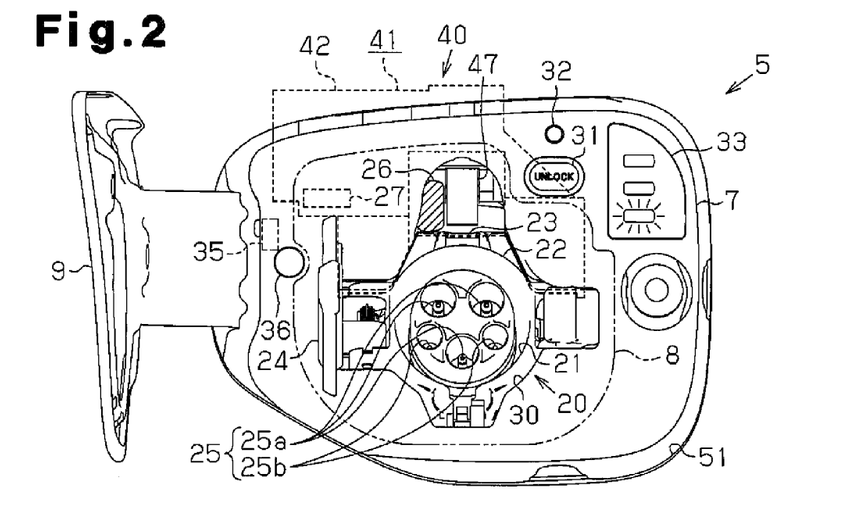
FIG. 2 is a front view showing an inlet including a power feeding connector.

As shown in FIG. 2, the power receiving connector 20 is arranged in the middle of the inlet 5. The power receiving connector 20 includes a receptacle 21. A plurality of connection terminals 25 are arranged in the receptacle 21 to electrically connect the power feeding plug 10 and power receiving connector 20. The connection terminals 25 include power terminals 25a, which provide a power transmission route, and signal terminals 25b, which provide communication routes for various types of signals. The power receiving connector 20 includes a peripheral upper surface 22 that defines a catch 23. The power feeding plug 10 includes a hook 16, which can be hooked to the catch 23.

Figure 5:
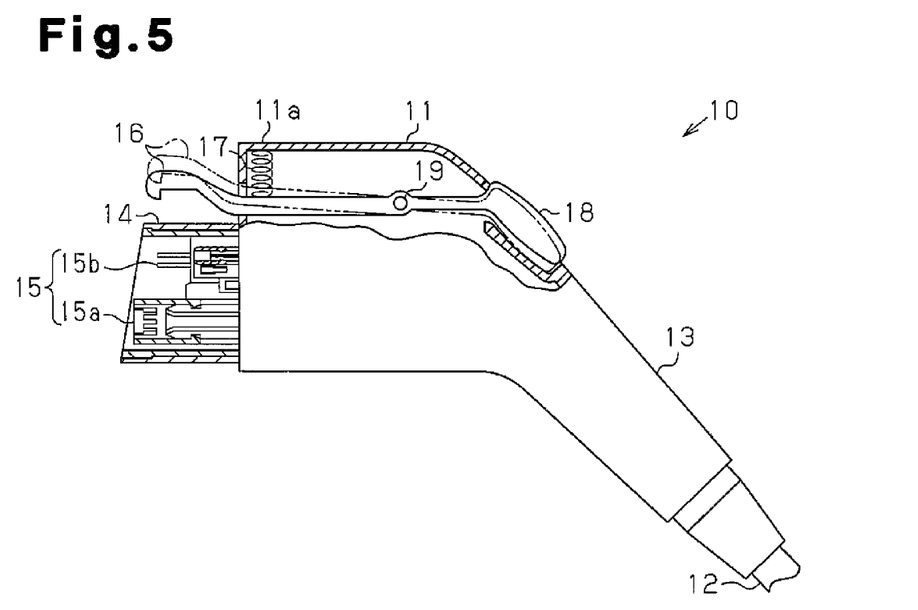
FIG. 5 is a schematic cross-sectional view showing a power feeding plug.

As shown in FIG. 5, the power feeding plug 10 has a main body 11. A cylindrical coupler 14 is arranged on a distal end 11a of the main body 11. The coupler 14 is fitted into the receptacle 21 of the power receiving connector 20. A plurality of connection terminals 15 are arranged in the coupler 14. The connection terminals 15 are electrically connected to the connection terminals 25 of the power receiving connector 20. The connection terminals 15 include power terminals 15a, which provide a power transmission route, and signal terminals 15b, which provide communication routes for various types of signals.

The hook 16 of the power feeding plug 10 is arranged on an upper part of the coupler 14. The hook 16 holds the power feeding plug 10 in a state fitted into the power receiving connector 20. When the hook 16 is moved to a close position as shown by the solid lines in FIG. 5 and hooked to the catch 23 of the power receiving connector 20, the power feeding plug 10 is held on the power receiving connector 20. When the hook 16 is pivoted and moved away from the coupler 14 to an open position as shown by the broken lines in FIG. 5, removal of the power feeding plug 10 from the power receiving connector 20 is allowed. An urging spring 17 normally urges the hook 16 to the close position. The main body 11 of the power feeding plug 10 includes a grip 13. A lever 18 is arranged in the upper side of the grip 13. The lever 18 is pushed to pivot the hook 16 about a pivot shaft 19 and move the hook 16 to the open position.

Referring to FIG. 1, the vehicle 1 includes a charge ECU 75, which executes charging-related control. The charge ECU 75 communicates with the verification ECU 71 through an in-vehicle local area network (LAN) 76 and receives ID verification results from the verification ECU 71. When starting charging, the charge ECU 75 checks whether charging conditions are satisfied, which are the ID verification having been successful and the power feeding plug 10 having been fitted to the power receiving connector 20.

Figure 6:
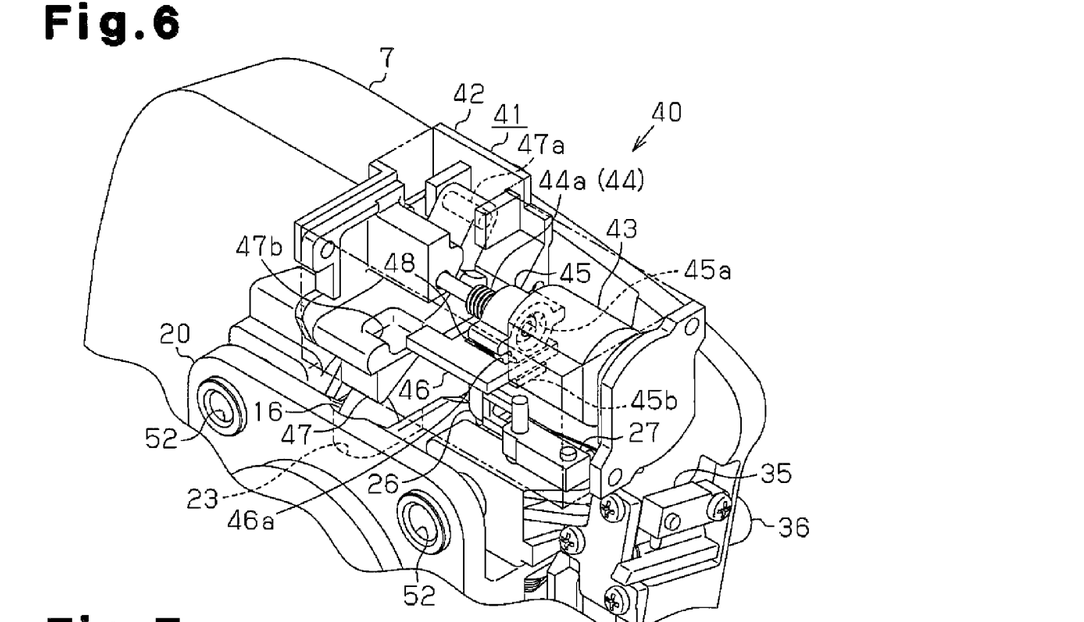
FIG. 6 is a perspective view showing a lock mechanism in an unlock state.
Figure 7:
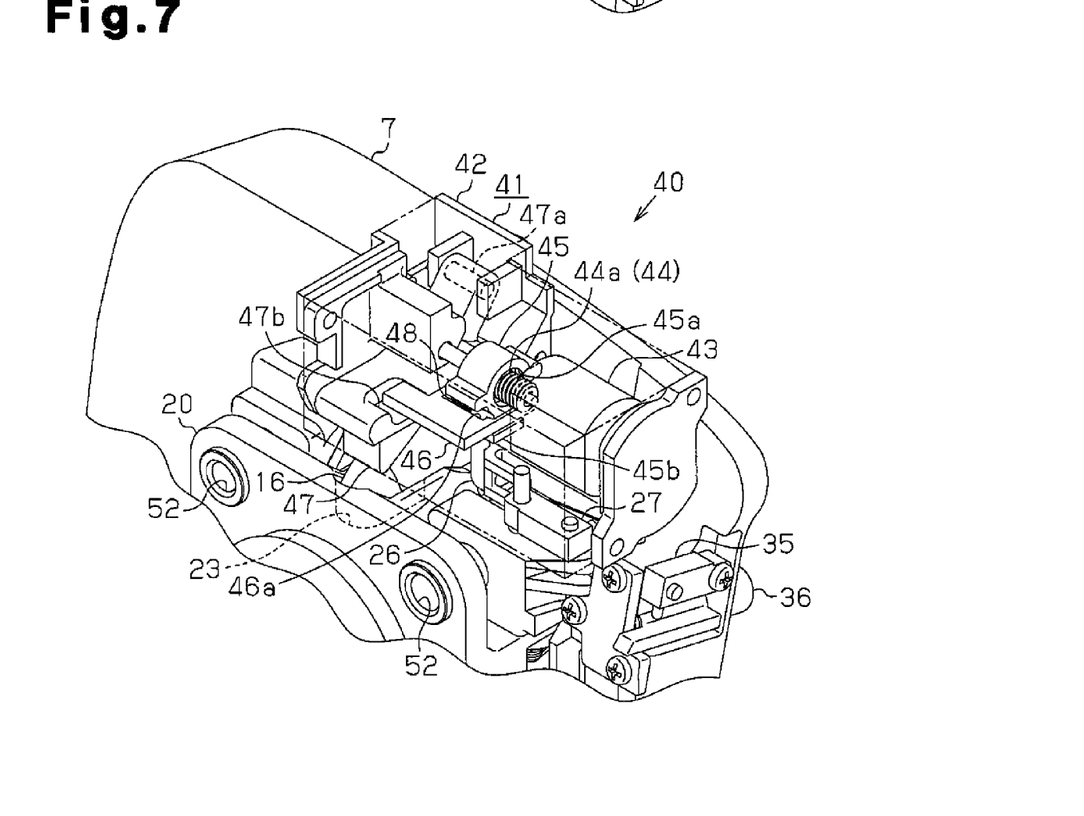
FIG. 7 is a perspective view showing the lock mechanism in a lock state.

Referring to FIGS. 6 and 7, the charging system 60 includes a power feeding plug locking device 40. The locking device 40 includes a lock mechanism 41, which serves as a mechanical portion that holds the power feeding plug 10 in a state connected to the inlet 5. A case 42 accommodates components forming the lock mechanism 41. In this example, the lock mechanism 41 is an electrical lock mechanism and includes a motor 43, which serves as a driving device, a transmission rod 44, a stopper 45, a lock bar 46, and a lock member 47. The transmission rod 44, which may be a geared shaft, is rotated by the driving force of the motor 43. The stopper 45 converts rotational motion of the transmission rod 44 to linear motion of the stopper 45. The lock bar 46 moves in correspondence with the linear motion of the stopper 45 and engages the lock member 47, which is located above the hook 16, to hold the hook 16 in a restricted state. The restricted state refers to a state in which the hook 16 cannot move to the open position.

The structure of the lock mechanism 41 will now be described in detail. The transmission rod 44 is fixed to and rotated integrally with a drive shaft of the motor 43. The transmission rod 44 is cylindrical and includes a threaded portion 44a, which has threads extending in the circumferential direction.

The stopper 45 is engaged with the transmission rod 44 and is in contact with the lock bar 46 to move the lock bar 46 in the axial direction of the motor 43. A bore extends through the central portion of the stopper 45 in the axial direction of the transmission rod 44. A threaded portion 45a is formed by the wall of the bore. The threaded portion 45a of the stopper 45 is engaged with the threaded portion 44a of the transmission rod 44 to integrally couple the transmission rod 44 and stopper 45. Thus, when the transmission rod 44 is rotated by the motor 43, the threaded portion 44a of the transmission rod 44 rotates in the threaded portion 45a of the stopper 45. The lock bar 46 restricts rotation of the stopper 45. Accordingly, the stopper 45 is moved straight in the axial direction of the transmission rod 44.

The lock member 47 is arranged above the hook 16 when hooked to the catch 23 and supported to be pivotal about a pivot shaft 47a. The lock member 47 includes an engagement recess 47b. The lock bar 46, when engaged with the engagement recess 47b, restricts movement of the lock member 47. When the lock bar 46 restricts movement of the lock member 47, movement of the hook 16 is restricted. This holds the hook 16 in a restricted state. The stopper 45 is movable back and forth between two positions, namely, a lock position (restriction position) and an unlock position (non-restriction position). At the lock position, the lock bar 46 is engaged with the engagement recess 47b of the lock member 47 and restricts movement of the hook 16. At the unlock position, the lock bar 46 is disengaged from the engagement recess 47b of the lock member 47 and allows movement of the hook 16.

The lock bar 46 is flat. A buffer hole 46a extends through the central part of the lock bar 46. A tab 45b, which extends from the lower part of the stopper 45, is loosely fitted in the buffer hole 46a. More specifically, in a state in which the tab 45b is fitted into the buffer hole 46a, a gap is formed between the tab 45b and an inner wall of the lock bar 46 defining the buffer hole 46a. When the tab 45b comes into contact with the inner wall of the lock bar 46, movement of the stopper 45 from the lock position to the unlock position moves the lock bar 46 from a lock position to an unlock position (refer to FIG. 6).

An urging spring 48 is arranged in the gap between the tab 45b and the portion of the inner wall located closer to the lock member 47 of the lock bar 46. The urging spring 48 constantly urges the lock bar 46 toward the lock position. Accordingly, due to the urging spring 48, the tab 45b is constantly in contact with the portion of the inner wall of the lock bar 46 that is located closer to the motor 43. When the stopper 45 moves from the unlock position to the lock position, the tab 45b pushes the inner wall of the lock bar 46 by means of the urging spring 48 and moves the lock bar 46 from the unlock position to the loc position (refer to FIG. 7). When the hook 16 is not completely hooked to the catch 23 and is thus in a semi-engaged state, the hook 16 interferes with the lock bar 46, and the lock bar 46 cannot be moved from the unlock position to the lock position. In such a case, the buffer hole 46a and the urging spring 48 absorb the moving force of the stopper 45. This reduces the load applied by the stopper 45 to the lock bar 46.

Figure 3:
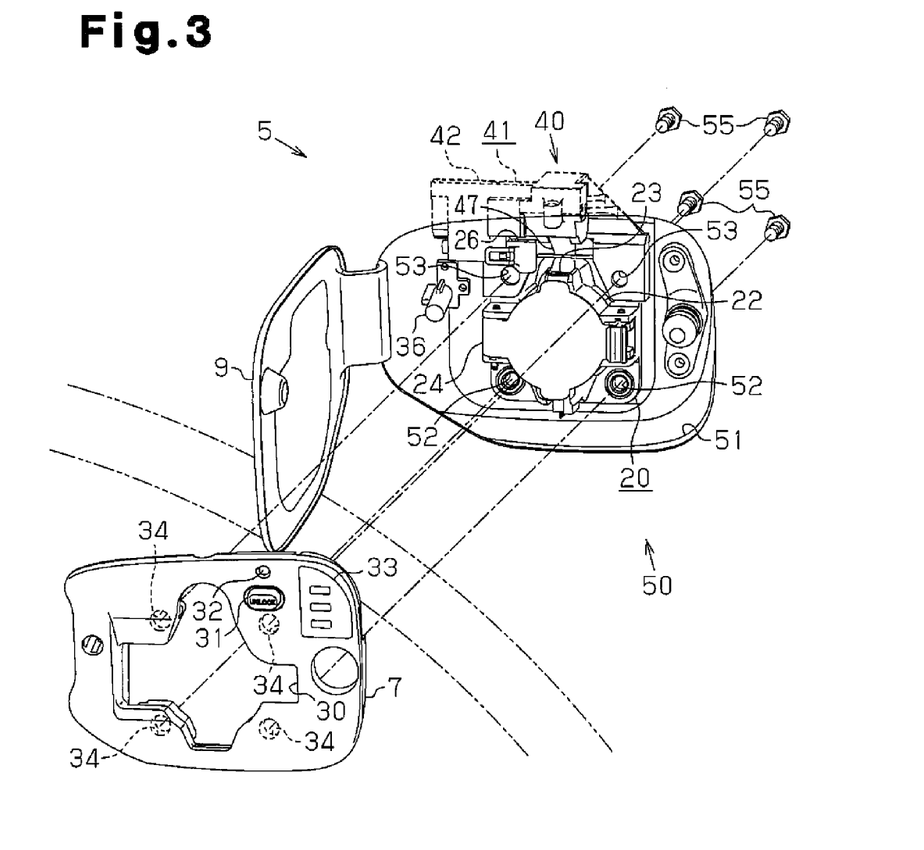
FIG. 3 is an exploded perspective view showing a structure for coupling the inlet of FIG. 2.

Referring to FIGS. 2 and 3, the locking device 40 includes a hook detection switch 27, which detects whether the hook 16 is hooked to the catch 23. A slide piece 26 is arranged at the hooking position of the hook 16. When the hook 16 is hooked to the catch 23, the slide piece 26 moves laterally and perpendicular to the hooking direction of the hook 16. The hook detection switch 27 detects the engagement of the hook 16 when detecting movement of the slide piece 26. The slide piece 26 is constantly urged toward the hook 16.

Referring to FIG. 1, the inlet 5 includes a lock ECU 77, which serves as a control unit of the power feeding plug locking device 40. The lock ECU 77 is connected to the in-vehicle LAN 76 and exchanges various types of information with other ECUs such as the charge ECU 75 and the door ECU 78. The lock ECU 77 is connected to the hook detection switch 27 and motor 43, which are arranged in the lock mechanism 41 of the inlet 5. The lock ECU 77 controls activation of the motor 43 to switch an operational state of the lock mechanism 41 between a lock state and an unlock state. When the lock mechanism 41 is in the lock state, movement of the hook 16 is restricted and removal of the power feeding plug 10 is prohibited. When the lock mechanism 41 is in the unlock state, movement of the hook 16 is permitted and removal of the power feeding plug 10 is allowed.

In the charging system 60 of the present embodiment, when the power feeding plug 10 is connected to the power receiving connector 20, the locking device 40 performs a locking operation of the lock mechanism 41 in cooperation with the locking operation of the vehicle doors to hold the power feeding plug 10 in a state connected to the power receiving connector 20. The hook detection switch 27 monitors whether the hook 16 is hooked to the catch 23. When detecting hooking of the hook 16, the hook detection switch 27 sends a hook detection signal to the charge ECU 75 and lock ECU 77.

As shown in FIG. 2, the locking device 40 is arranged above the power receiving connector 20. A cover module 7, which covers the outer side of the inlet 5, is coupled to the inlet 5. The cover module 7 includes an opening 30 through which the receptacle 21 of the power receiving connector 20 is exposed. In this manner, the cover module 7 covers portions of the inlet 5 excluding the receptacle 21 of the power receiving connector 20. The cover module 7 functions as a protector.

An unlock switch 31, which is operated to release the operational state of the lock mechanism 41 from the lock state, is arranged in the cover module 7. The unlock switch 31 is formed by, for example, a push type momentary switch and sends an operation signal (switch signal) when pushed to the lock ECU 77. The unlock switch 31 is arranged near the power receiving connector 20 and is exposed to the exterior when a lid 9 is open. The unlock switch 31 is one example of an operation unit.

An answer lamp 32, which indicates the operational state of the lock mechanism 41, is arranged in the cover module 7. The answer lamp 32 is connected to the lock ECU 77, which controls the illumination state of the answer lamp 32. For example, the answer lamp 32 flashes once in green when the operational state of the lock mechanism 41 is shifted to the lock state and flashes twice in green when the operational state of the lock mechanism 41 is shifted to the unlock state. Further, the answer lamp 32 is continuously illuminated in red when an operation failure occurs in the lock mechanism 41. The answer lamp 32 is one example of a notification unit.

A charge indicator 33, which indicates the state of charge of the battery 4, is arranged in the cover module 7. The charge indicator 33 is connected to the lock ECU 77, which controls the indication of the charge indicator 33. The charge indicator 33 includes, for example, three lamps arranged next to one another in the vertical direction. The charge indicator 33 selectively illuminates the displays in accordance with the state of charge of the battery 4. For example, when the battery 4 is fully charged, the charge indicator 33 illuminates all three lamps. The charge indicator 33 is always illuminated when the lid 9 of the inlet 5 is open and turned off when the lid 9 is closed.

A lid detection switch 35, which detects the opening of the lid 9, is arranged in the inlet 5. The lid detection switch 35 includes a slide piece 36, which is retracted by the lid 9 as the lid 9 closes. The lid detection switch 35 detects the opening and closing of the lid 9 when the slide piece 36 moves and sends a detection signal to the lock ECU 77. The slide piece 36 is coupled to the power receiving connector 20, projected out of the cover module 7, and urged out of the inlet 5.

Figure 4:
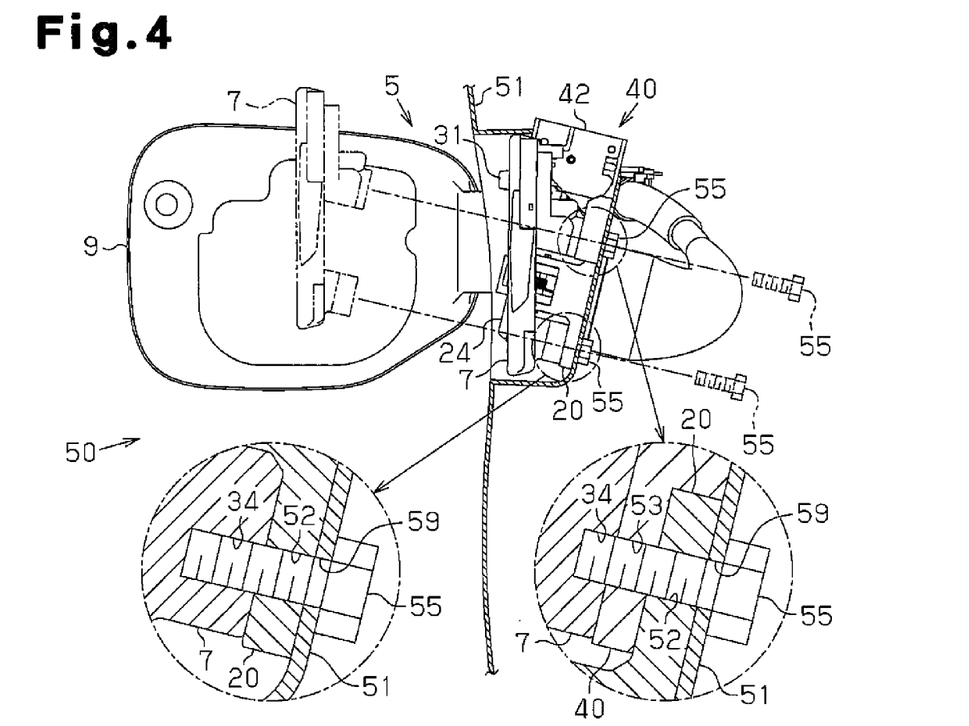
FIG. 4 is an exploded side view, partially in enlarged cross-sectional views, showing the structure for coupling the inlet of FIG. 2.

Referring to FIGS. 3 and 4, the inlet 5 includes a coupling mechanism 50 that couples the power receiving connector 20, the locking device 40, and the cover module 7 to the vehicle body 51 with bolts 55 from the inner side of the vehicle body 51. The bolts 55 are fastened from the inner side of the vehicle body 51 to prevent the bolts 55 from being unfastened when one attempts to perform an unlocking operation in an unauthorized manner with the locking device 40. Thus, in the present example, the bolts 55 are hidden in the vehicle body 51 to prevent unauthorized removal of the bolts 55.

The power receiving connector 20 is first coupled to the inlet 5 of the vehicle body 51. The power receiving connector 20 has four corners, each including a connector bolt hole 52 aligned with a corresponding body bolt hole 59 of the vehicle body 51. Then, the locking device 40 is coupled to the outer side of the power receiving connector 20. The locking device 40 includes two device bolt holes 53 aligned with the two upper connector bolt holes 52 of the power receiving connector 20. The cover module 7 is coupled to the outer side of the power receiving connector 20 and locking device 40. The bolts 55 are inserted through the bolt holes 52 and 53 from the inner side of the vehicle body 51 and mated with threaded holes 34, which are formed in the cover module 7, to fasten the power receiving connector 20, the locking device 40, and the cover module 7 to the vehicle body 51.

As shown by the left enlarged view in FIG. 4, at the lower portion of the inlet 5, the bolts 55 fasten together the vehicle body 51, the power receiving connector 20, and the cover module 7. As shown by the right enlarged view in FIG. 4, at the upper portion of the inlet 5, the bolts 55 fasten together the vehicle body 51, the power receiving connector 20, the locking device 40, and the cover module 7.

As shown in FIG. 1, the lock ECU 77 includes a door lock state acquisition circuit 77a, which acquires a door locking state signal indicating whether the doors are locked from the door ECU 78. The door lock state acquisition circuit 77a may directly acquire the door lock state signal (door lock signal/door unlock signal) from the door ECU 78. Alternatively, the door lock state acquisition circuit 77a may make an inquiry to the door ECU 78 to indirectly acquire the door lock state signal. The door lock state acquisition circuit 77a corresponds to a door lock state confirmation unit.

The lock ECU 77 further includes a lock mechanism controller 77b, which controls the operation of the lock mechanism 41. When the lock mechanism 41 is in the unlock state, the lock mechanism controller 77b sends a forward rotation drive signal to the motor 43 and shifts the lock mechanism 41 to the lock state if the hook detection signal and the door lock signal are acquired.

The lock mechanism controller 77b allows removal of the power feeding plug 10 from the power receiving connector 20 if a door unlocking operation is performed and the unlock switch 31 is operated. Operation of the unlock switch 31 when the lock mechanism 41 is in the lock state sends an operation signal to the lock mechanism controller 77b. Accordingly, if the operation signal is acquired from the unlock switch 31 and if the door unlock signal is acquired from the door ECU 78, the lock mechanism controller 77b sends a reverse rotation drive signal to the motor 43 and shifts the lock mechanism 41 to the unlock state. The lock mechanism controller 77b corresponds to a controller.

The lock ECU 77 also includes a lamp illumination controller 77c, which controls the illumination of the answer lamp 32. When the lock mechanism 41 is shifted to the lock state, the lamp illumination controller 77c, for example, flashes the answer lamp 32 once in green when the operational state of the lock mechanism 41 is shifted to the lock state to indicate lock completion. When the lock mechanism 41 is shifted to the unlock state, the lamp illumination controller 77c, for example, flashes the answer lamp 32 twice in green when the operational state of the lock mechanism 41 is shifted to the unlock state to indicate unlock completion. When the lock mechanism 41 cannot perform a locking or unlocking operation in a normal manner, the lamp illumination controller 77c, for example, continuously illuminates the answer lamp 32 in red to indicate an error.

Further, the lock ECU 77 includes a state of charge (SOC) acquisition circuit 77d, which acquires the state of charge from the charge ECU 75. When receiving a lid open signal from the lid detection switch 35, the SOC acquisition circuit 77d periodically makes inquiries to the charge ECU 75 to acquire the state of charge.

The lock ECU 77 also includes an indicator controller 77e, which controls the indication of the charge indicator 33. The indicator controller 77e indicates the state of charge acquired by the SOC acquisition circuit 77d on the charge indicator 33. For example, when the state of charge of the battery 4 is low, the indicator controller 77e illuminates only the lowest one of the three lamps of the charge indicator 33 (refer to FIG. 2).

The operation of the locking device 40 when charging the battery 4 with the power feeding plug 10 will now be discussed with reference to FIGS. 2 and 6 to 10.

The lid 9 of the inlet 5 is first opened to charge the battery 4 of the vehicle 1 with the power feeding plug 10, as shown in the state of FIG. 2. As the lid 9 opens, the slide piece 36, which is connected to the lid detection switch 35, moves outward from the inlet 5. Based on the movement of the slide piece 36, the lid detection switch 35 sends a lid open signal to the lock ECU 77. In this state, the indicator controller 77e shows the state of charge on the charge indicator 33 based on the state of charge acquired by the SOC acquisition circuit 77d. In this case, the state of charge is low. Thus, only the lowest lamp of the charge indicator 33 is illuminated. Then, a connector cap 24 of the power receiving connector 20 is opened.

Figure 8:
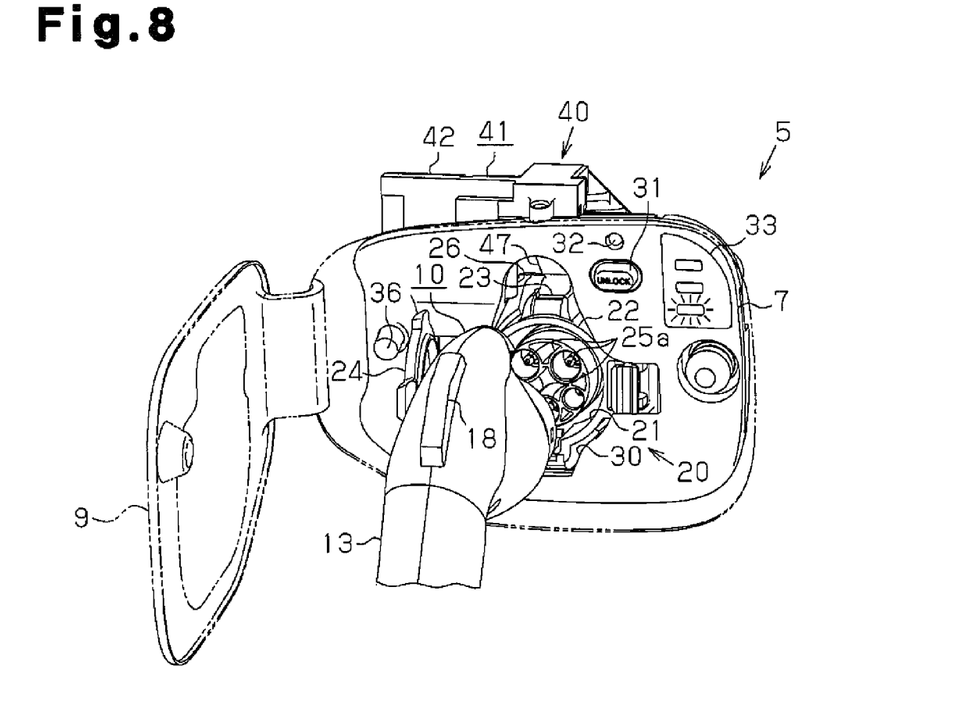
FIG. 8 is a perspective view showing the power feeding plug when connected to a power receiving connector of the inlet.
Figure 9:
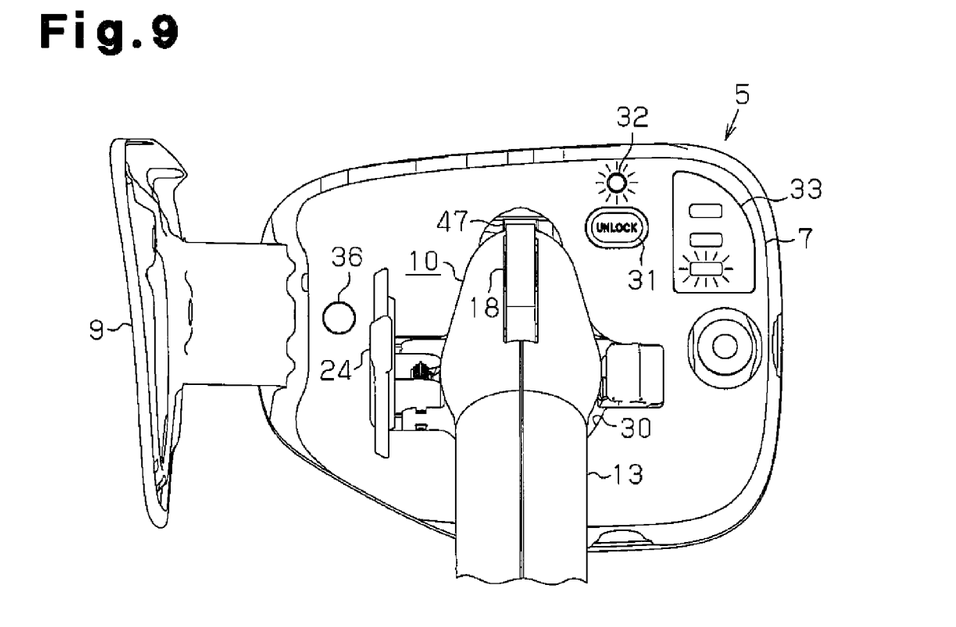
FIG. 9 is a front view showing the inlet in a state in which the power feeding plug is connected to the power receiving connector.

Subsequently, referring to FIG. 8, in a state in which the hook 16 is aligned with the catch 23, the power feeding plug 10 is fitted to the power receiving connector 20. Here, the side surface of the hook 16 comes into contact with the slide piece 26. Accordingly, the hook detection switch 27 detects the engagement of the hook 16 with the catch 23 from the movement of the slide piece 26 and sends a hook detection signal to the lock ECU 77.

When the power feeding plug 10 reaches the innermost position of the power receiving connector 20, the connection terminals 15 of the power feeding plug 10 are connected to the connection terminals 25 of the power receiving connector 20. Here, the upper surface of the hook 16 is in contact with the lock member 47. When the connection terminals 15 of the power feeding plug 10 are connected to the connection terminals 25 of the inlet 5, the lock ECU 77 acquires a connection signal from the signal terminals 25b and recognizes connection of the power feeding plug 10 and inlet 5.

Figure 10A:
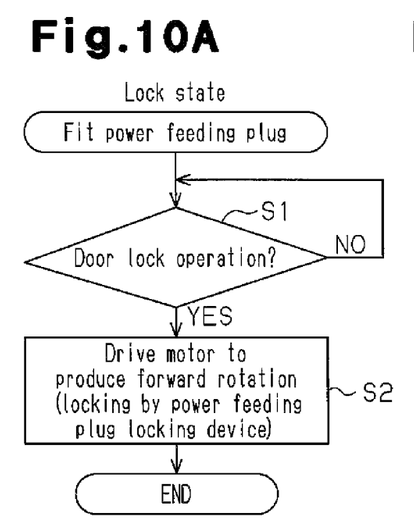
FIG. 10A is a flowchart showing a process for performing a locking operation with the power feeding plug locking device.

Referring to FIG. 10A, when the power feeding plug 10 is connected to the power receiving connector 20, the lock ECU 77 determines whether a door locking operation has been performed (step S1). More specifically, the door lock state acquisition circuit 77a determines whether a door lock signal has been received from the door ECU 78. When the doors are in an unlock state (step S1: NO), the lock ECU 77 waits until the doors are locked, that is, until the door lock state acquisition circuit 77a receives the door lock signal.

Subsequently, when the doors are locked (step S1: YES), the lock ECU 77 shifts the locking device 40 to the lock state (step S2). In this manner, when the user performs a door locking operation in a state in which the power feeding plug 10 is connected to the power receiving connector 20, the locking device 40 is automatically shifted to the lock state. As described above, the door locking operation may be an operation in which an authorized user, who is carrying the electronic key 80, touches the lock sensor 57 on the door handle 56 or an operation in which the user pushes the lock button 84 of the electronic key 80. Here, as long as the authorized user performs a door locking operation (i.e., locking of the power feeding plug 10), the electronic key 80 carried by the authorized user successfully performs ID verification. If ID verification is successful, the door ECU 78 sends a door lock signal to the door locking device 79 and the lock ECU 77.

If the hook detection signal and the door lock signal have been acquired, the lock mechanism controller 77b sends a forward rotation drive signal to the motor 43 of the lock mechanism 41 and engages the lock bar 46 with the lock member 47 (refer to FIG. 6). This restricts movement of the hook 16 with the lock member 47. Thus, removal of the hook 16 from the catch 23 is restricted. Here, the lamp illumination controller 77c flashes the answer lamp 32 once in green to indicate lock completion (refer to FIG. 9). Once in the lock state, current starts to flow from the power feeding plug 10 to the inlet 5 to charge the battery 4.

When the lock mechanism 41 is in the lock state, the lock member 47 restricts movement of the hook 16. Thus, the hook 16 cannot be separated from the catch 23. Accordingly, an unauthorized person cannot remove the power feeding plug 10 from the inlet 5.

Figure 10B:
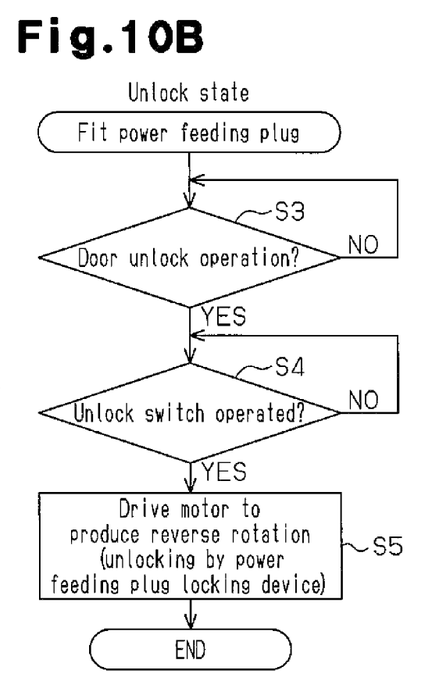
FIG. 10B is a flowchart showing a process for performing an unlocking operation with the power feeding plug locking device.

Referring to FIG. 10B, when charging is completed, the lock ECU 77 determines whether a door unlocking operation has been performed (step S3). More specifically, the door lock state acquisition circuit 77a determines whether a door unlock signal has been received from the door ECU 78. When the doors are in a lock state (step S3: NO), the lock ECU 77 waits until the doors are unlocked, that is, until the door lock state acquisition circuit 77a receives the door unlock signal.

Then, when the doors are unlocked (step S3: YES), the lock ECU 77 determines whether the unlock switch 31 has been operated (step S4). When an operation signal has not been received from the unlock switch 31 (step S4: NO), the lock ECU 77 waits until the operation signal is received.

When the operation signal is received from the unlock switch 31 (step S4: YES), the lock ECU 77 shifts the lock mechanism 41 to the unlock state (step S5). When removing the power feeding plug 10 from the inlet 5 after charging of the battery 4 is completed, the user performs a door unlocking operation and also operates the unlock switch 31. As mentioned above, the door unlocking operation may be an operation in which an authorized user, who is carrying the electronic key 80, touches the unlock sensor 58 on the door handle 56 or an operation in which the user pushes the unlock button 85 of the electronic key 80. Here, as long as the authorized user is removing the power feeding plug 10, the electronic key 80 carried by the authorized user successfully performs ID verification. If ID verification is successful, the door ECU 78 sends a door unlock signal to the door locking device 79 and the lock ECU 77.

If the operation signal of the unlock switch 31 and the door unlock signal have been acquired, the lock mechanism controller 77b sends a reverse rotation drive signal to the motor 43 of the lock mechanism 41 and disengages the lock bar 46 from the lock member 47 (refer to FIG. 7). This shifts the lock mechanism 41 to the unlock state. Here, the lamp illumination controller 77c flashes the answer lamp 32 twice in green to indicate unlock completion.

In this state, the user pushes the lever 18 of the power feeding plug 10 to disengage the hook 16 from the catch 23 and then pulls the hook 16 away from the catch 23. This removes the power feeding plug 10 from the power receiving connector 20 of the inlet 5.

In the present embodiment, the locking device 40 performs a locking operation on the lock mechanism 41 when a door locking operation is performed to prohibit removal of the power feeding plug 10. Further, the locking device 40 performs an unlocking operation on the lock mechanism 41, when a door unlocking operation is performed and the unlock switch 31 is operated, to allow removal of the power feeding plug 10. Thus, the locking device 40 is not operated whenever a door locking operation is performed, and the component durability of the locking device 40 is improved. Further, the unlock switch 31 is required to be operated when performing an unlocking operation of the lock mechanism 41. This prompts the user to perform the operation of the unlock switch 31 to shift the lock mechanism 41 to the unlock state and differs from when the lock mechanism 41 performs the locking operation.

The present embodiment has the advantages described below.

(1) In addition to the door unlocking operation, the unlock switch 31 is required to be operated for the power feeding plug locking device 40 to perform an unlocking operation. Accordingly, the locking device 40 does not perform unlocking when only a door unlocking operation is performed. This reduces the operation frequency of the locking device 40 and thereby improves the component durability of the locking device 40. Further, the requirement of operation of the unlock switch 31 notifies the user that the locking device 40 has performed unlocking. If the locking device 40 were to perform automatic unlocking when the user performs only door unlocking, the user may forget that the locking device 40 is in the unlock state. In such a case, when the user leaves the vehicle 1 unattended, the power feeding plug 10 may be removed in an unauthorized manner. However, the present embodiment includes the unlock switch 31 and allows the user to be more conscious of the unlocking operation of the locking device 40.

(2) The power feeding plug locking device 40 starts to operate when the power feeding plug 10 is connected to the power receiving connector 20. Thus, the lock mechanism 41 is operated only when necessary.

(3) The lock mechanism 41 is not operated whenever the doors are locked and unlocked. Further, the locking device 40 automatically performs a locking operation when the doors are locked. This ensures that the locking operation of the locking device 40 is performed without being forgotten.

(4) The unlock switch 31 is arranged in the cover module 7, which is located near the power receiving connector 20 of the inlet 5. Thus, the user can easily operate the unlock switch 31. Further, the unlock switch 31 is exposed to the exterior when the lid 9 is open. Thus, an unauthorized person cannot operate the unlock switch 31. Moreover, the unlock switch 31 is operated only when necessary.

(5) The answer lamp 32 is illuminated when the lock operation and the unlock operation are completed. Thus, when the power feeding plug locking device 40 undergoes a lock operation or an unlock operation, the user can recognize the operation of the power feeding plug locking device 40 from the illumination of the answer lamp 32.

(6) The user is verified through wireless verification performed by the electronic key system 70. This is effective for preventing theft and eliminates the need to prepare a separate verification device for the power feeding plug locking device 40.

(7) In a state in which the lock member 47 is in contact with the hook 16, the lock bar 46 restricts movement of the lock member 47 to restrict movement of the hook 16. Further, disengagement of the lock bar 46 from the lock member 47 permits movement of the hook 16. Accordingly, removal of the power feeding plug 10 is prohibited with a simple structure.

It should be apparent to those skilled in the art that the present invention may be embodied in many other specific forms without departing from the spirit or scope of the invention. Particularly, it should be understood that the present invention may be embodied in the following forms.

In the above embodiment, the lock bar 46 of the lock mechanism 41 may be moved in any direction.

In the above embodiment, the lock bar 46 is engaged with the lock member 47 to restrict movement of the hook 16 of the power feeding plug 10. However, the lock bar 46 may directly restrict movement of the hook 16. In such a case, the lock member 47 is eliminated, and the lock bar 46 takes the role of the lock member.

The driving device of the lock mechanism 41 is not limited to the motor 43. For example, a driving device such as a solenoid may be used.

In the above embodiment, the lock mechanism 41 restricts movement of the hook 16 to prohibit removal of the power feeding plug 10. However, removal of the power feeding plug 10 may be prohibited by restricting removal of the coupler 14 of the power feeding plug 10.

Figure 11:
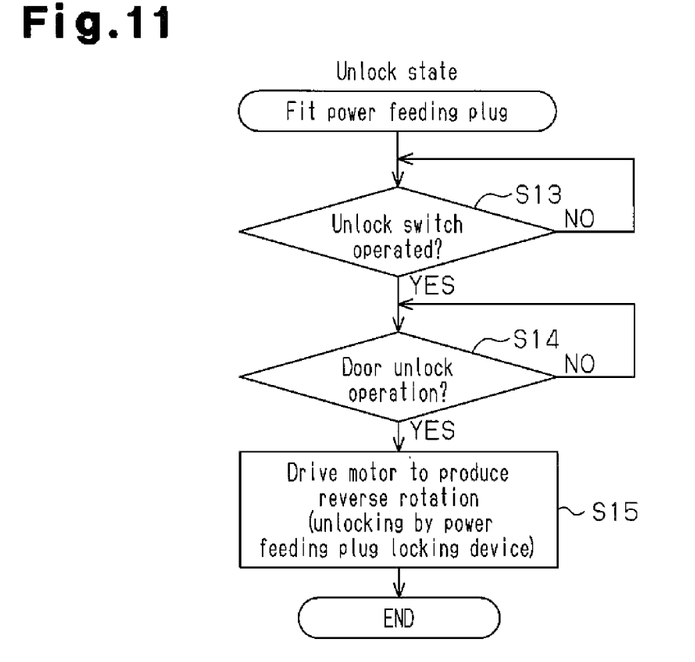
FIG. 11 is a flowchart showing a process for performing the unlocking operation with the power feeding plug locking device.

In the above embodiment, the processing order of steps S3 and S4 in FIG. 10B may be reversed. In this case, when performing the unlocking operation with the power feeding plug locking device 40, for example, the unlock switch 31 is first operated and this operation state is stored in a memory or the like. Then, when the doors are unlocked in this situation, the locking device 40 starts the unlocking operation. More specifically, referring to FIG. 11, when charging is completed, the lock ECU 77 determines whether the unlock switch 31 has been operated (step S13). When an operation signal is not received from the unlock switch 31 (step S13: NO), the lock ECU 77 waits until receiving the operation signal. Then, when the operation signal is received from the unlock switch 31 (step S13: YES), the lock ECU 77 determines whether a door unlock operation has been performed (step S14). When the doors are locked (step S14: NO), the lock ECU 77 waits until the doors are unlocked. Then, when the doors are unlocked (step S14: YES), the lock ECU 77 shifts the locking device 40 to the unlock state (step S15).

In the above embodiment, a lock switch for the lock mechanism 41 may be arranged in the inlet 5. More specifically, the power feeding plug locking device 40 may perform a locking operation if the lock switch is operated and a door locking operation is performed. Moreover, the unlock switch 31 and the lock switch may both be included in the inlet 5. Further, a single switch may be shared as the unlock switch 31 and the lock switch.

In the above embodiment, the unlock switch 31 does not have to be located next to the power receiving connector 20, that is, in the compartment closed by the lid. The unlock switch 31 may be arranged at a different location.

In the above embodiment, the unlock switch 31 may be replaced by a different operation unit.

In the above embodiment, the door locking operation and door unlocking operation may be performed by performing at least either one of smart verification and the pushing of the button 84 or 85 of the electronic key 80.

In the above embodiment, the cover module 7 may be eliminated. In this case, the unlock switch 31, the answer lamp 32, the charge indicator 33, and the like may be arranged in the power receiving connector 20 or the inlet of the vehicle body 51.

In the above embodiment, the person using the power feeding plug 10 is verified based on the ID verification performed between the vehicle 1 and the electronic key 80 by the electronic key system. However, the power feeding plug 10 may include a communication unit that performs wireless communication with the electronic key 80. In this case, the power feeding plug 10 performs ID verification directly with the electronic key 80 to determine whether the person using the power feeding plug 10 is authorized. The communication unit may be formed by an antenna, transmitter, and receiver like that arranged in the vehicle and may be an immobilizer amplifier when the electronic key includes a transponder.

In the above embodiment, the electronic key system 70 may use an immobilizer system using a transponder that originates a transmitted ID code.

The frequency of the radio wave used by the electronic key system 70 is not necessarily limited to LF and UHF and other frequencies may be used. Further, the frequency of the radio wave transmitted from the vehicle 1 to the electronic key 80 and the frequency of the radio wave returned from the electronic key 80 to the vehicle do not necessarily have to be different and may be the same.

User verification is not limited to key verification that uses the electronic key 80. Other types of verification, such as biometric verification, may be performed.

In the above embodiment, a charge switch may be arranged on the cable 12 to start and stop charging.

In the above embodiment, the present invention is applied to the inlet 5 of the plug-in type hybrid vehicle 1. However, the present invention is not limited to plug-in type vehicles and may be applied to an inlet of an electric vehicle.

The machine in which the power feeding plug locking device 40 is installed is not limited to the vehicle 1. The power feeding plug locking device 40 may be applied to any machine that includes a rechargeable battery.

The present examples and embodiments are to be considered as illustrative and not restrictive, and the invention is not to be limited to the details given herein, but may be modified within the scope and equivalence of the appended claims.

The invention claimed is:

1. A power feeding plug locking device that locks a power feeding plug to a power feeding inlet, wherein the power feeding inlet is arranged in a machine, the machine including a door that can be locked, the power feeding plug locking device comprising:
a lock mechanism including a lock member that is movable between a lock position and an unlock position and a driving device that is operable to move the lock member between the lock position and the unlock position, wherein the lock mechanism prohibits removal of the power feeding plug from the inlet when the lock member is positioned at the lock position and allows removal of the power feeding plug from the inlet when the lock member is positioned at the unlock position;
a switch which is operable by a user and which, when operated, outputs an operational signal that instructs the driving device to move the lock member between the lock position and the unlock position;
a door lock state confirmation unit that confirms whether the door of the machine is locked and outputs a door lock state signal; and
a controller communicatively coupled with the switch, the door lock state confirmation unit, and the driving device, wherein the controller controls the driving device to move the lock member from the lock position to the unlock position when the controller receives the operational signal from the switch that instructs the driving device to move the lock member to the unlock position and the door lock state signal from the door lock state confirmation unit that indicates a door unlock state of the door of the machine, wherein the operational signal is a signal different from the door lock state signal.

2. The power feeding plug locking device according to claim 1, wherein the controller controls operation of the lock mechanism if the power feeding plug is connected to the inlet.

3. The power feeding plug locking device according to claim 1, wherein the controller controls the driving device to move the lock member to the lock position when the door of the machine is locked.

4. The power feeding plug locking device according to claim 1, further comprising a lid that opens and closes the inlet, wherein the switch is arranged near a power feeding connector in the inlet and is exposed to the exterior when the lid opens the inlet.

5. The power feeding plug locking device according to claim 1, further comprising a notification unit that notifies a user of completion of the operation of the lock mechanism when the lock member is shifted from the lock position to the unlock position or when the lock member is shifted from the unlock position to the lock position.

6. The power feeding plug locking device according to claim 1, further comprising a protector that covers the inlet while exposing a receptacle of the inlet switch is arranged on the protector.

7. The power feeding plug locking device according to claim 1, wherein the power feeding plug includes a hook that can be hooked to the inlet, and the lock member restricts movement of the hook and prohibits removal of the power feeding plug at the lock position, and the lock member permits movement of the hook and allows removal of the power feeding plug at the unlock position.

8. The power feeding plug locking device according to claim 1, wherein the machine includes a communication master that performs wireless communication with a communication terminal carried by a user and verifies the communication terminal, and the door is locked and unlocked when the verification is successful.

9. The power feeding plug locking device according to claim 1, wherein the switch is an unlock switch, and the controller controls the driving device to move the lock member to the unlock position when the door lock state confirmation unit confirms the door unlock state of the door of the machine and the unlock switch is operated.

10. The power feeding plug locking device according to claim 1, wherein the machine is a vehicle, and the door is a vehicle door.

11. A power feeding plug locking device that locks a power feeding plug to a power feeding inlet, wherein the power feeding inlet is arranged in a machine, the machine including a door that can be locked, the power feeding plug locking device comprising:
a lock mechanism selectively shiftable between a lock state and an unlock state, wherein the lock mechanism prohibits removal of the power feeding plug from the inlet in the lock state and allows removal of the power feeding plug from the inlet in the unlock state;

an unlock switch which, when operated, outputs an operational signal that enables shifting the lock mechanism between the lock state and the unlock state;

a door lock state confirmation unit that confirms whether the door of the machine is locked and outputs a door lock state signal; and a controller communicatively coupled with the unlock switch, the door lock state confirmation unit, and the lock mechanism, wherein the controller shifts the lock mechanism between the lock state and the unlock state based on the operation signal from the unlock switch and the door lock state signal from the door lock state confirmation unit, and wherein the controller shifts the lock mechanism to the unlock state when the door lock state confirmation unit confirms an unlock state of the door of the machine and the unlock switch is operated.

12. The power feeding plug locking device according to claim 11, wherein the controller controls operation of the lock mechanism if the power feeding plug is connected to the inlet.

13. The power feeding plug locking device according to claim 11, wherein the controller shifts the lock mechanism to the lock state when the door of the machine is locked.

14. The power feeding plug locking device according to claim 11, further comprising a lid that opens and closes the inlet, wherein the unlock switch is arranged near a power feeding connector in the inlet and is exposed to the exterior when the lid opens the inlet.

15. The power feeding plug locking device according to claim 11, further comprising a notification unit that notifies a user of completion of the operation of the lock mechanism when the lock mechanism is shifted from the lock state to the unlock state or when the lock mechanism is shifted from the unlock state to the lock state.

16. The power feeding plug locking device according to claim 11, further comprising a protector that covers the inlet while exposing a receptacle of the inlet to which the power feeding plug is connected, wherein the unlock switch is arranged on the protector.

17. The power feeding plug locking device according to claim 11, wherein the power feeding plug includes a hook that can be hooked to the inlet, the lock mechanism includes a lock member that moves between a lock position and an unlock position, the lock member restricts movement of the hook and prohibits removal of the power feeding plug at the lock position, and the lock member permits movement of the hook and allows removal of the power feeding plug at the unlock position.

18. The power feeding plug locking device according to claim 11, wherein the machine includes a communication master that performs wireless communication with a communication terminal carried by a user and verifies the communication terminal, and the door is locked and unlocked when the verification is successful.

19. The power feeding plug locking device according to claim 1, wherein the machine is a vehicle, and the door is a vehicle door.

* * * * *